(12) United States Patent
Huang et al.

(10) Patent No.: US 9,444,096 B2
(45) Date of Patent: Sep. 13, 2016

(54) ORGANOMETALLIC-INORGANIC HYBRID ELECTRODES FOR LITHIUM-ION BATTERIES

(71) Applicant: Battelle Memorial Institute, Richland, WA (US)

(72) Inventors: Qian Huang, Richland, WA (US); John P. Lemmon, Kennewick, WA (US); Daiwon Choi, Richland, WA (US); Lelia Cosimbescu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 128 days.

(21) Appl. No.: 14/167,944

(22) Filed: Jan. 29, 2014

(65) Prior Publication Data

US 2014/0212753 A1 Jul. 31, 2014

Related U.S. Application Data

(60) Provisional application No. 61/758,675, filed on Jan. 30, 2013.

(51) Int. Cl.
| | |
|---|---|
| *H01M 4/60* | (2006.01) |
| *H01M 4/36* | (2006.01) |
| *H01M 4/137* | (2010.01) |
| *H01M 4/58* | (2010.01) |
| *H01M 10/0525* | (2010.01) |

(52) U.S. Cl.
CPC ............ *H01M 4/364* (2013.01); *H01M 4/137* (2013.01); *H01M 4/5825* (2013.01); *H01M 4/604* (2013.01); *H01M 10/0525* (2013.01); *Y02E 60/122* (2013.01); *Y02P 70/54* (2015.11)

(58) Field of Classification Search
CPC . H01M 4/137; H01M 4/364; H01M 2004/28
See application file for complete search history.

(56) References Cited

U.S. PATENT DOCUMENTS

| | | | |
|---|---|---|---|
| 4,547,439 A | 10/1985 | Genies | |
| 4,781,443 A * | 11/1988 | Giles | 252/500 |
| 7,887,970 B1 | 2/2011 | Gerald, II et al. | |
| 2002/0136898 A1 | 9/2002 | Nishikitani et al. | |
| 2007/0082267 A1 | 4/2007 | Goodenough et al. | |
| 2008/0187838 A1* | 8/2008 | Le | 429/231.95 |
| 2010/0009256 A1 | 1/2010 | Kusachi et al. | |
| 2011/0052952 A1* | 3/2011 | Roh et al. | 429/94 |

FOREIGN PATENT DOCUMENTS

| | | | |
|---|---|---|---|
| CN | 102347476 | | 2/2012 |
| JP | 60-177197 | * | 9/1985 |
| JP | 2002-175800 | | 6/2002 |
| JP | 2003-332601 | * | 11/2003 |
| JP | 2009-238945 | | 10/2009 |

OTHER PUBLICATIONS

Machine translation of JP 2002-175800, published on Jun. 21, 2002.*
Machine translation of JP 2003-332601, published on Nov. 21, 2003.*
Translation of JP 60-177197, published on Sep. 11, 1985.*
Sigma Aldrich's "Matterial Matters TM", 2009, vol. 4, No. 2, p. 31.*
Doeff, Marca M. et al., "Optimization of Carbon Coatings on LiFePO$_4$," *Lawrence Berkeley National Laboratory* (Jul. 2005).
Hou, Chao et al., "Integrated Solid-Nanoporous Copper/Oxide Hybrid Bulk Electrodes for High-performance Lithium-Ion Batteries," *Scientific Reports*, vol. 3, Article No. 2878, 7 pages (Oct. 2013).
Huang, Qian et al., "Composite organic radical-inorganic hybrid cathode for lithium-ion batteries," *Journal of Power Sources*, vol. 233, pp. 69-73 (Jul. 2013).
Huang, Qian et al., "Organometallic-Inorganic Hybrid Cathode," *Materials Research Society Symposium for Advanced Materials 2013 Spring Meeting & Exhibit in San Francisco*, California, 13 pages (Apr. 2013).
International Search Report and Written Opinion for PCT/US2014/013935 (mailed May 23, 2014).
Kim, Jae-Kwang, "Advanced Materials for Rechargeable Lithium Batteries," *Thesis for the Degree of Doctor of Philosophy* (2013).
Kim, Jae-Kwang et al., "Towards flexible secondary lithium batteries: polypyrrole-LiFePO$_4$ thin electrodes with polymer electrolytes," *J. Mater. Chem.*, vol. 22, pp. 15045-15049 (Jun. 2012).
Lemmon, John P. et al., "Composite Organic Radical-Inorganic Hybrid Cathode," p. 1 and 3 (Apr. 2012).
Muldoon, John et al., "Electrolyte roadblocks to a magnesium rechargeable battery," *Energy Environ. Sci.*, vol. 5, pp. 5941-5950 (Jan. 2012).
Rahimi, Azam, "Inorganic and Organometallic Polymers: A Review," *Iranian Polymer Journal*, vol. 13, No. 2, pp. 149-164 (Apr. 2004).
Song, Zhiping et al., "Towards sustainable and versatile energy storage devices: an overview of organic electrode materials," *Energy Environ. Sci.*, vol. 6, pp. 2280-2301 (May 2013).
Tamura, Kosaku et al., "Charge/Discharge Properties of Organometallic Batteries Fabricated with Ferrocene-Containing Polymers," *Macromol. Rapid Commun.*, vol. 29, pp. 1944-1949. (Dec. 2008).
Yang, Yali et al., "Novel Synthesis and Characterization of Side-Chain Ferrocene-Containing Polymers," *Macromolecules*, vol. 35, pp. 3426-3432 (Mar. 2002).

* cited by examiner

*Primary Examiner* — Anca Eoff
(74) *Attorney, Agent, or Firm* — Klarquist Sparkman, LLP

(57) ABSTRACT

Disclosed are embodiments of active materials for organometallic and organometallic-inorganic hybrid electrodes and particularly active materials for organometallic and organometallic-inorganic hybrid cathodes for lithium-ion batteries. In certain embodiments the organometallic material comprises a ferrocene polymer.

23 Claims, 12 Drawing Sheets

Homogeneous mixing

Interfacial contact

Conventional Process: Combine A with B

Process: Combine A and its environment with B and its environment

High Rate Pulse Discharge Procedure

- Charge: at 1C
- Discharge: 100s at 1C, 10s at 10C (pulse), repeated

10th (dot line), 30th (dash line), 50th (solid line) cycles

ORGANOMETALLIC-INORGANIC HYBRID ELECTRODES FOR LITHIUM-ION BATTERIES

CROSS REFERENCE TO RELATED APPLICATION

This application claims the benefit of U.S. Provisional Patent Application No. 61/758,675, filed Jan. 30, 2013, which is hereby incorporated in its entirety, by reference.

ACKNOWLEDGMENT OF GOVERNMENT SUPPORT

This invention was made with government support under DE-AC05-76RL01830 awarded by the U.S. Department of Energy. The government has certain rights in the invention.

FIELD

Disclosed are materials for an organometallic electrode material, organometallic-inorganic hybrid electrode materials and particularly materials for organometallic-inorganic hybrid cathodes for lithium-ion batteries, and electrodes made therefrom.

SUMMARY

Disclosed are electrode active materials and composites of electrode active materials, electric conductivity-imparting agents, and electrodes made thereof, which composites and electrodes have high-energy densities, high efficiency and/or long cycle life. Also disclosed are methods for producing the materials, composites, and electrodes. More specifically, disclosed are embodiments of active materials for organometallic or organometallic-inorganic hybrid electrode active materials, and electrodes made of such materials. In certain embodiments, the electrode active materials form electrodes, and in certain embodiments, cathodes for lithium-ion batteries.

In one embodiment, a cathode comprises an active material comprising a ferrocene polymer satisfying formula (2):

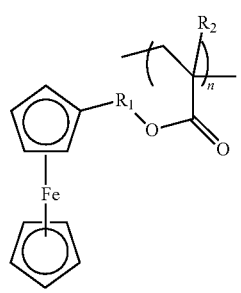
(2)

wherein $R_1$ is $-(CH_2)-_m$, m=1-10, preferably m=1-5, and $R_2$=H or a methyl group. In certain embodiments the cathode comprises a ferrocene polymer that satisfies formula (1):

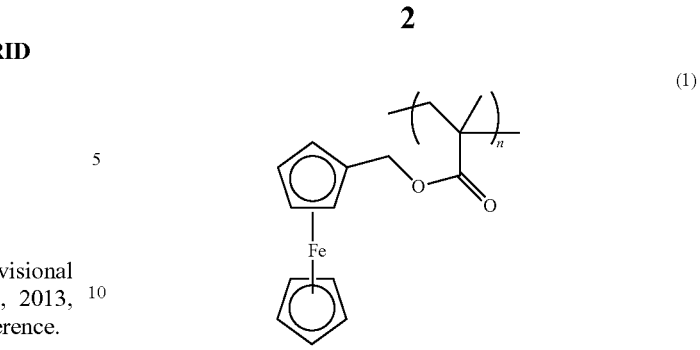
(1)

wherein n>0. In some embodiments the ferrocene polymer comprises poly(2-ferrocenylmethyl methacrylate) (PF-MMA) with a molecular weight of from 1,000 to 1,000,000. In certain embodiments the cathode further comprises or consists essentially of an inorganic active material and a conductive agent and optionally, a binder. In other embodiments the cathode further comprises or consists essentially of inorganic active material, a first conductive material and a second conductive material and optionally, a binder. In further embodiments the cathode includes a weight ratio of the ferrocene polymer to inorganic active material of 1:100 to 100:1. In other embodiments the weight ratio of the ferrocene polymer to the first conductive agent is from 1:20 to 5:1. In other embodiments the weight ratio of the ferrocene polymer to the first conductive agent is 1:10 to 3:1. In yet other embodiments the weight ratio of the inorganic active material to the second conductive agent is from 1:10 to 50:1. Further embodiments have the weight ratio of the inorganic active material to the second conductive agent is 2:1 to 50:1.

In certain embodiments the first conductive material is different from the second conductive material. In some embodiments of the cathode active material, compositions or electrodes, the inorganic active material comprises $LiMO_2$, $Li_xM_2O_4$ wherein 0<x<2, and M is Ni, Co, Mn, Fe, Al, and/or Cr, $MnO_2$, $Li_yV_2O_5$ wherein 0<y<2, $LiN_{0.5}Mn_{1.5-z}Ti_3O_4$ wherein 0<z<1.5, $xLi_2MnO_3 \cdot (1-x)LiMO_2$ wherein 0<x<1 and M is Fe, Mn, Co, Ni, Al, and/or Cr, $MoS_2$, $Li_2S$, $SeS_x$, $MF_3$ wherein M is Ti, V, Fe, Mn, and/or Co, $LiAMF_6$ wherein A is Mg, Ca, Sr, Ba, Ni, Cu, Zn, and/or Cd and wherein M is Ti, V, Cr, Mn, Fe, Co, and/or Ni, $LiMPO_4$ wherein M is Fe, Mn, Co and/or Ni, $LiMBO_3$ wherein M is Fe, Mn, Co and/or Ni, $Li_2MSiO_4$ wherein M is Fe, Mn, Co and/or Ni, or mixtures thereof.

Also disclosed are lithium ion batteries comprising a cathode active material comprising a ferrocene polymer satisfying formula (1):

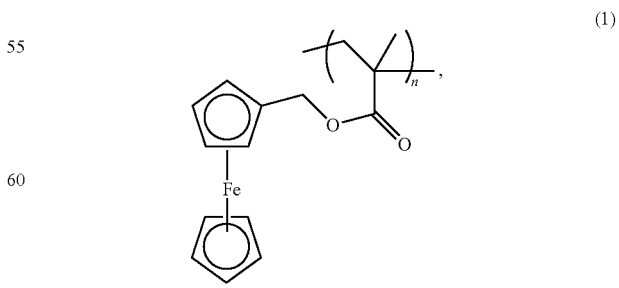
(1)

an inorganic active material, a conductive agent and an anode.

Also disclosed is a cathode comprising, consisting essentially of or consisting of a ferrocene polymer satisfying formula (1)

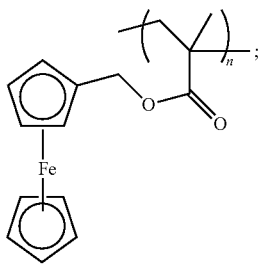
(1)

an inorganic active material, a conductive agent, and a binder. Further disclosed is a cathode comprising, consisting essentially of or consisting of an active material comprising a ferrocene polymer satisfying formula (1):

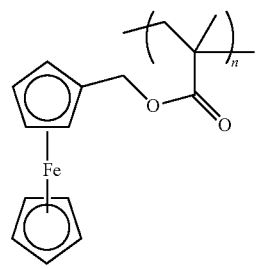
(1)

wherein n>0, an inorganic active material, a first conductive material, a second conductive material, and a binder. In certain embodiments this cathode has a weight ratio of the ferrocene polymer to the first conductive agent of from 1:20 to 5:1. In other embodiments this cathode has a weight ratio of the inorganic active material to the second conductive agent of from 1:10 to 50:1. In certain embodiments of this cathode the first conductive material is different from the second conductive material. In certain embodiments of this cathode the inorganic active material comprises $LiFePO_4$.

Also disclosed are methods for making the cathode compositions and electrodes, such as a method for making a lithium-ion cathode composition, the method comprising mixing poly(2-ferrocenylmethyl methacrylate) (PFMMA) with a first conductive agent to form an organometallic active material composition, then mixing the organometallic active material composition with an inorganic active agent and a second conductive agent to form a hybrid cathode composition.

The foregoing and other objects, features, and advantages of the invention will become more apparent from the following detailed description, which proceeds with reference to the accompanying figures.

DETAILED DESCRIPTION

Figure 1A:
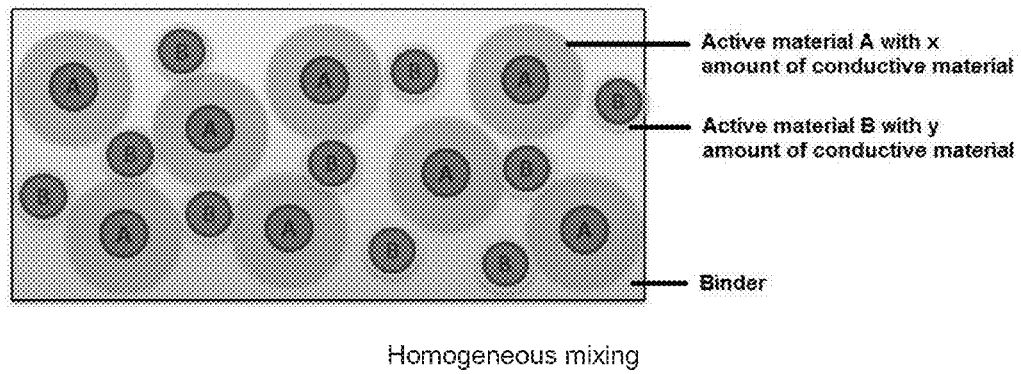
FIGS. 1(a)-1(d) illustrate method of making effects of embodiments of the disclosed organometallic-inorganic hybrid electrode active materials, and with respect to FIG. 1(c) the effect on the components when made by a conventional method.

Disclosed are electrode active materials and composites of electrode active materials, electric conductivity-imparting agents, and electrodes made thereof, which composites and electrodes have high-energy densities, high efficiency and/or long cycle life. Also disclosed are methods for producing the materials, composites, and electrodes. More specifically, disclosed are embodiments of active materials for organometallic or organometallic-inorganic hybrid electrode active materials, and electrodes made of such materials. In certain embodiments, the electrode active materials form electrodes, and in certain embodiments, cathodes for lithium-ion batteries.

I. Terms and Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of ingredients, properties such as molecular weight, percentages, ratios and so forth, as used in the specification and claims are to be understood as being modified by the term "about." Unless otherwise indicated, non-numerical properties used in the specification or claims are to be understood as being modified by the term "substantially," meaning to a great extent or degree, as within inherent measurement uncertainties. Accordingly, unless otherwise indicated, implicitly or explicitly, the numerical parameters and/or non-numerical properties set forth are approximations that may depend on the desired properties sought, limits of detection under standard test conditions/methods, limitations of the processing method, and/or the nature of the parameter or property. When directly and explicitly distinguishing embodiments from discussed prior art, the embodiment numbers are not approximates unless the word "about" is recited.

To facilitate review of the various embodiments of the disclosure, explanations of specific terms are provided herein.

An active material of an electrode as used herein refers to a material contributing directly to the electrode reaction including the charging reaction and the discharging reaction, and performs a major function of a battery system.

An anode as used herein refers to an electrode through which electric charge flows into a polarized electrical device. From an electrochemical point of view, negatively-charged anions move toward the anode and/or positively-charged cations move away from it to balance the electrons arriving from external circuitry. In a discharging battery, such as the disclosed lithium/air batteries or a galvanic cell, the anode is the negative terminal where electrons flow out. If the anode is composed of a metal, electrons that it gives up to the external circuit are accompanied by metal cations moving away from the electrode and into the electrolyte.

Capacity as used herein refers to the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours.

Conductive (or conductivity) agents are included in particular embodiments herein as agents to enhance the electron conductivity of the electrode other than through the active material.

A cathode as used herein refers to an electrode through which electric charge flows out of a polarized electrical device. From an electrochemical point of view, positively charged cations invariably move toward the cathode and/or negatively charged anions move away from it to balance the electrons arriving from external circuitry. In a discharging battery, such as the disclosed lithium-ion batteries or a galvanic cell, the cathode is the positive terminal, toward the direction of conventional current. This outward charge is carried internally by positive ions moving from the electrolyte to the positive cathode.

Intercalation as used herein is a term referring to the insertion of a material (e.g., an ion or molecule) into the microstructure of another material. For example, lithium ions can insert, or intercalate, into graphite (C) to form lithiated graphite ($LiC_6$).

KETJENBLACK® carbon is an electroconductive carbon powder and is available from Akzo Nobel Polymer Chemicals, Chicago, Ill. In particular, EC-600JD has been found to be useful.

Lower alkyl refers an aliphatic group that is a branched or unbranched saturated hydrocarbon group of 1 to 10 carbon atoms, such as methyl, ethyl, n-propyl, isopropyl, n-butyl, isobutyl, t-butyl, pentyl, hexyl, heptyl, octyl, and the like.

Specific capacity as used herein refers to capacity per unit of mass. Specific capacity may be expressed in units of mAh/g, and often is expressed as mAh/g carbon when referring to a carbon-based electrode in Li/air batteries.

Specific energy as used herein refers to energy per unit of mass. Specific energy is commonly expressed in units of Wh/kg or J/kg. With respect to a metal/air battery, the mass typically refers to the mass of the entire battery and does not include the mass of oxygen absorbed from the atmosphere.

Specific power as used herein refers to power per unit of mass, volume, or area. For example, specific power may be expressed in units of W/kg. With respect to a metal ion battery cathode, the mass typically refers to the mass of the entire electrode.

II. Lithium Ion Batteries

Lithium ion batteries typically comprise two components that participate in electrochemical reactions to produce energy: an anode and a cathode. Lithium ion batteries produce energy through electrochemical reactions occurring between the anode and cathode. Typically both the anode and cathode are made of active materials that operate by lithium ions intercalating and de-intercalating or by reversible redox electrochemical reactions. In the intercalation mechanism mode, during battery discharge, lithium ions de-intercalate from the anode material and migrate to the cathode into which they insert. During a charging cycle, the opposite reaction occurs, i.e., lithium ions are extracted from the cathode material and migrate back to the anode where they reinsert.

A conventional lithium ion battery typically has a graphite anode. Other conventional anode materials include lithium alloys, metal oxides, silicon, tin, and others. Common electrolytes include lithium salts (e.g., $LiPF_6$, $LiBF_4$, $LiClO_4$) dissolved in organic solvents (e.g., ethylene carbonate, propylene carbonate, dimethyl carbonate, ethyl methyl carbonate, and combinations thereof).

Lithium ion battery cathodes formed of inorganic material operate to charge and discharge by de-insertion or insertion of $Li^+$. Inorganic cathodes tend to provide high energy but are low power and have safety, toxicity and resource availability issues. Known organic active material cathodes operate to charge and discharge by reversible redox electrochemical reactions. Some available lithium ion battery organic cathodes provide high power and are environmentally friendly. However, conventional organic cathodes typically have a low volumetric energy density.

To improve the state-of-art lithium battery performance, the described invention discloses superior organometallic polymer electrode and inorganic electrode active materials and discloses superior organometallic/inorganic hybrid electrodes comprised of the disclosed organometallic polymer(s) and inorganic compounds, with one or more conductive agents, to achieve high power performance from the organic moiety while maintaining the high volumetric energy density from the inorganic component(s). Embodiments of the resulting cathodes have superior, high-capacity density, energy density, and power density. Aspects of the superior electrical performances of embodiments of the disclosed hybrid cathodes are believed to be attributed at least in part to a synergistic effect between the disclosed organometallic polymer and the inorganic components of the hybrid electrode. The superior results due to the synergistic effects are realized, however, only when the electrode compositions are made in a particular manner. As such, also disclosed are methods of making such hybrid electrodes.

It was determined by the inventors that hybrid electrodes using conventional forming methods provide poor electrical properties performance and the functional electrical properties from the organic polymer (and/or the inorganic) components were significantly blocked in such hybrid cathode systems. The inventors hypothesize that the poor results of conventional hybrid cathode systems made in a conventional manners were attributable to the significantly different electrical properties between the organic polymer compounds, particularly poly(2-ferrocenylmethyl methacrylate) (PFMMA), and the inorganic compounds, which require significantly different electrical environments when they are used as electrochemical energy storage materials.

The disclosed organometallic-inorganic hybrid electrodes not only combine the advantages of each type of cathode, due to the manner of manufacture as discussed below, there is a resulting synergistic effect between the organic and the inorganic active materials of the composite hybrid electrodes, resulting in hybrid electrodes having significantly higher power (from the organometallic component), higher energy (from the inorganic component) and/or a long, sustainable life. More specifically, certain embodiments of the disclosed organometallic-inorganic hybrid electrodes provide superior electric properties based on the developed synergistic effect between the two types of active materials in the electrode, due (at least in part) to the disclosed method providing coating of the organometallic active material with conductive agent prior to mixing with the inorganic active agent. Further, the high-energy inorganic component of the hybrid electrode can recharge the organometallic component after high pulse discharge. The power and energy properties of the disclosed organometallic-inorganic hybrid electrodes are also tunable by controlling the ratio of the organometallic component to the inorganic component in the hybrid electrodes. As such, disclosed are organometallic-inorganic hybrid cathodes for energy storage devices from small scale (<100 Wh, for portable electric devices, and like devices) to large scale (>10 KWh, for such uses as transportation and smart grid integration).

III. Organometallic Electrodes and Organometallic-Inorganic Hybrid Electrodes Disclosed are embodiments of active materials for organometallic and organometallic-inorganic hybrid electrodes and particularly active materials for organometallic and organometallic-inorganic hybrid cathodes for lithium-ion batteries.

Embodiments of the organometallic electrode active material comprise, or consist essentially of, or consist of poly(2-ferrocenylmethyl methacrylate) (PFMMA) having a structure represented by the following general formula (1):

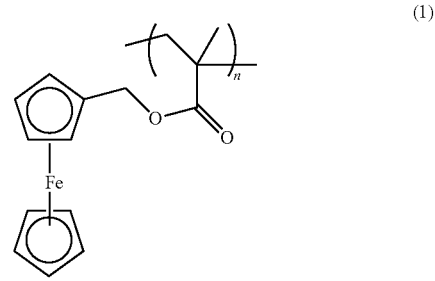

(1)

wherein n>0.

In certain embodiments, the organometallic electrode active material comprises, or consists essentially of, or consists of, a ferrocene polymer compound having a structure represented by formula (1) and a conductive agent. In other embodiments, the organometallic electrode active material comprises, or consists essentially of, or consists of, a ferrocene polymer compound having a structure represented by formula (1), a conductive agent and a binder.

Embodiments of active materials for organometallic-inorganic hybrid electrodes comprise, or consist essentially of, or consist of, a ferrocene polymer compound having a structure represented by formula (1) (that is, PFMMA) and an inorganic active material. In certain embodiments, the organometallic-inorganic hybrid electrode materials comprise, or consist essentially of, or consist of, PFMMA, an inorganic active material and one or more conductive agents. Certain of these embodiments further include a binder.

In exemplary embodiments, it suffices if the organometallic compound, particularly poly(2-ferrocenylmethyl methacrylate) (PFMMA), contributes directly to an electrode reaction at the cathode or the anode, and the electrode to be used as an electrode active material is not limited to one of the cathode and the anode. However, in view of the energy density, the disclosed ferrocene polymer compound having a structure represented by the general formula (1) (i.e. PFMMA) is particularly well-suited for use as an active material of the cathode. The battery according to an exemplary embodiment is preferably a lithium battery, particularly a lithium ion battery. Notably, however, the cathode active material composition and cathodes disclosed may also be suitable for use in this cathode can also be used in other batteries such as sodium battery and magnesium battery.

Although the organometallic electrode active material may comprise a ferrocene polymer compound having a structure represented by the following general formula (1), i.e. poly(2-ferrocenylmethyl methacrylate) (PFMMA):

(1)

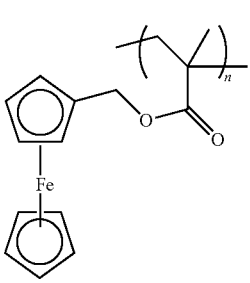

alternative organometallic active materials may comprise compounds having a structure represented by the following general formula (2):

(2)

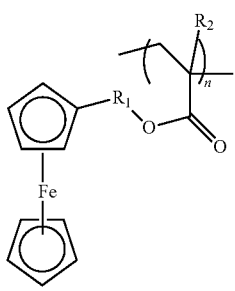

wherein $R_1$ is a lower alkyl as defined herein, or $R_1$=—$(CH_2)$—$_m$, m=1-10, preferably m=1-5, and $R_2$=H or a methyl group.

PFMMA and/or the polymer compounds according to formula (2), have a number-average molecular weight of preferably from 1,000 to 100,000, or not less than 100, or not less than 500, or not less than 750, or not less than 1000, or not less than 1500. In some embodiments the polymer may have an average molecular weight of greater than 100,000.

The ferrocene polymer shape may be any of being linear, branched, and/or networked. Further, the ferrocene polymer compound may have a structure of being crosslinked with a crosslinking agent. The upper limit of the number-average molecular weight is not especially limited but on the convenience of the synthesis, the poly(2-ferrocenylmethyl methacrylate) can suitably be used which has a number-average molecular weight of not more than 1,000,000, more preferably not more than 500,000, still more preferably not more than 250,000. Here, the above-mentioned number-average molecular weight is determined by GPC (gel permeation chromatography) or LLS (Laser Light Scattering) measurement.

The poly(2-ferrocenylmethyl methacrylate) can be synthesized as follows:

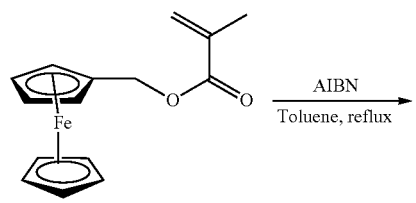

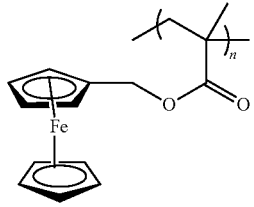

-continued

Figure 11:
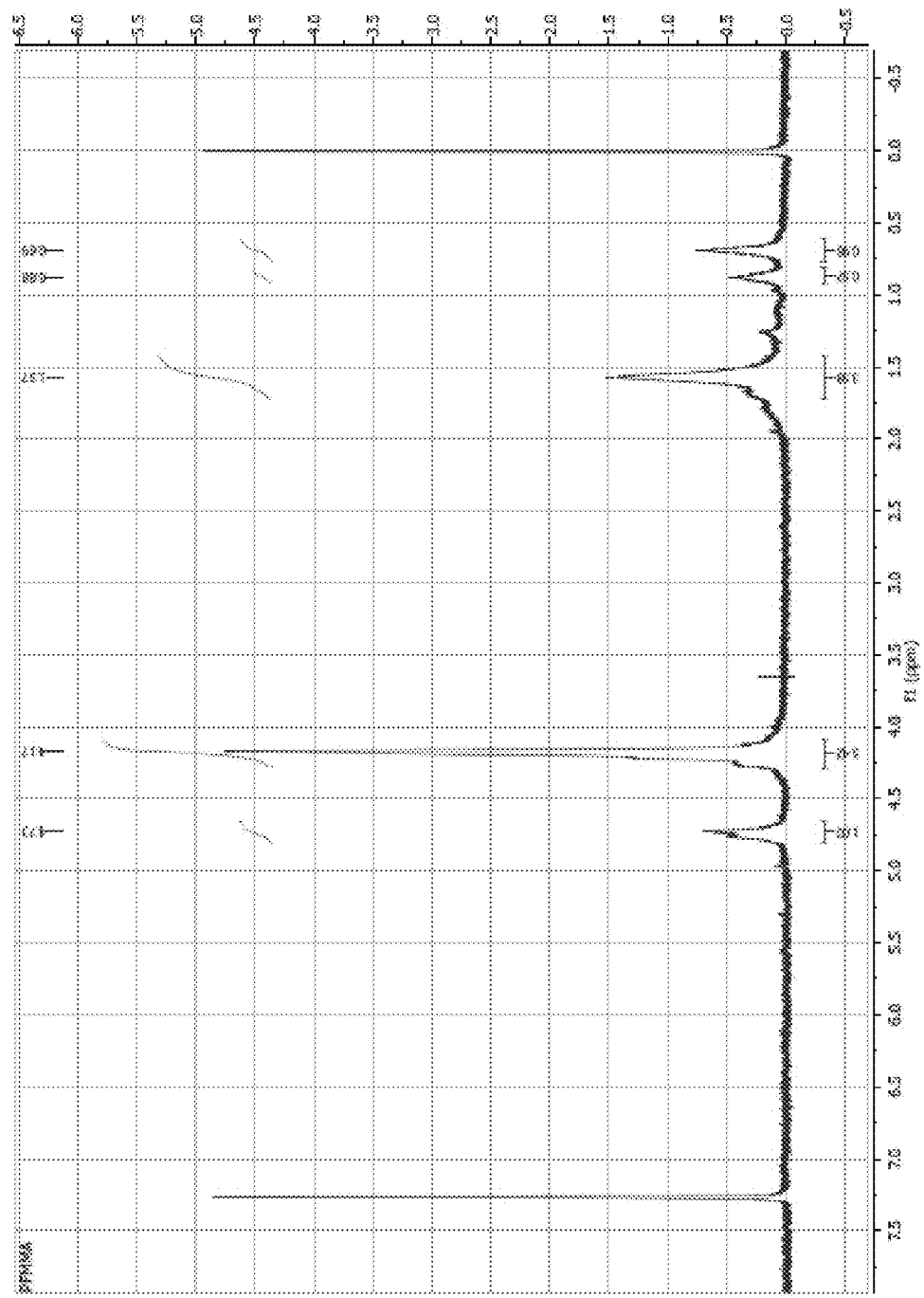
FIG. 11 is a $^1H$ NMR spectrum from the analysis of the PFMMA synthesis product.

The poly(2-ferrocenylmethyl methacrylate) was in one instance synthesized by charging a two-neck round bottom flask affixed with a reflux condenser, with 2-(ferrocenylmethyl)methacrylate (0.50 g, 1.76 mmol, 1 eq) and 20 mL of anhydrous toluene. The mixture was stirred until it became a homogeneous greenish solution, then radical initiator AIBN (azobisisobutyronitrile) was added (29 mg, 0.176 mmol, 0.1 eq) followed by heating to about 60° C. The reaction mixture was stirred at 60° C. for 2 days, during which time it turned from greenish yellow, to reddish-brown, to dark brown. AIBN was recrystallized twice from methanol, prior to use. At the end of two days the mixture was quenched by the addition of 2-3 drops of MeOH. The reaction mixture was diluted with 100 mL of toluene, and 50 mL of methylene chloride, and the dark insoluble solid was removed by filtration. The filtrate was concentrated to a residue, dissolved in 3-5 mL of toluene and the product was precipitated with addition of hexanes (30 mL). The beige solid was isolated by filtration, and the process was repeated twice on the filtrate, to recover as much product as possible. The final product was isolated as a beige solid (0.2 g) in 40% yield. As can be seen in FIG. 11, the product was analyzed by $^1$HNMR (500 mHz, CDCl$_3$): 4.81 (d, br, 2H), 4.25 (m, br, 9H), 1.65 (s, br, 3H), 0.96 (s, br, 1H), 0.77 (s, br, 2H).

Ferrocene polymers satisfying formula (2) can be made in the same basic manner as disclosed above for PFMMA.

The ferrocene polymer may be a homopolymer that has only a partial structure represented by the general formula (1) (or formula (2)) as a repeating unit structure, or may be a copolymer which further has another partial structure as a repeating unit structure. In certain embodiments structures of potential copolymers satisfy (1a), 1(b), (1c), or mixtures thereof, as follows:

1(a)

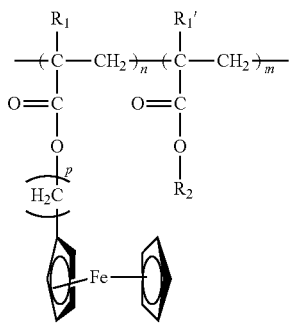

-continued

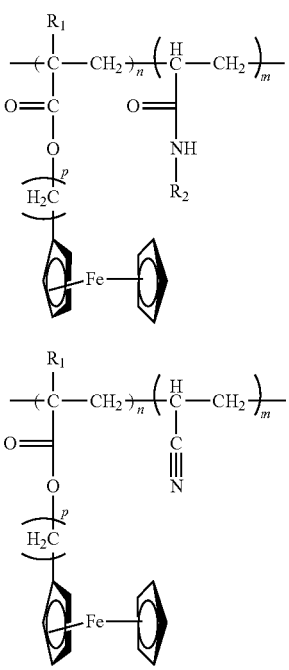

In certain embodiments structures of potential homopolymers satisfy 1(d) (as with formula (2) above) as follows:

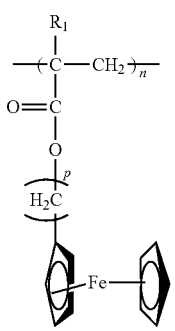

For structures 1(a), 1(b), 1(c) and 1(d), the polymers (copolymers and homopolymer) include but are not limited to the following specific examples: $R_1$ and $R_1'$ can, independently, be hydrogen or methyl; p=1-10, and preferably is 1, 2, 3, 4 or 5; n, m are the number of repeating units and depend on the feed ratio (i.e. original amount of each monomer used in the reaction); and $R_2$ is hydrogen, methyl, ethyl, propyl, isopropyl, butyl, a substituted methyl, phenyl, a substituted phenyl ring, or a ring containing a heteroatom. For the copolymers, the partial structure represented by the general formula 1(d) may be in the mol % range of 0-100% with respect to the total of the polymeric compound.

The above disclosed copolymers can be synthesized following the below basic synthesis process (see, Yang, Y.; Xie, Z.; Wu, C. *Macromolecules* 2002, 35, 3426): poly[(2-ferrocenylmethyl)Methacrylate-co-acrylate]: A tetrahydrofuran (THF) solution of 2-ferrocenemethyl)methacrylate (1 equivalent), a desired polymerizable acrylate and azobisisobutyronitrile (AIBN) (0.05 to 0.3 equivalents) is heated to 60° C. for 24 hours. The flask is then cooled in an ice bath and the reaction quenched with methanol to terminate the reaction. The polymer is isolated by precipitation in hexane, followed by drying under vacuum. The yields of the reaction vary according to the monomers used and their purities. The polymer is then characterized by $^1$HNMR, IR and its molecular weight determined by GPC (gel permeation chromatography) or LLS (Laser Light Scattering) techniques. The acrylate monomers are esters that contain vinyl groups, such that two carbons are double bonded to each other, and directly attached to the carbonyl group. The amount of the second monomer is determined by those skilled in the art and depends on the desired physical properties of the final polymer, such as physical state (powder, amorphous, tacky, paste) or solubility. In addition, when the non-ferrocenyl monomer contains functionality such as amine or carboxylic acid, the resulting co-polymer can be further functionalized if so desired. The amount of AIBN can also be adjusted by those skilled in the art to achieve a desired molecular weight of the polymers. The lower the amount of AIBN or other initiator, the higher the molecular weight of the resulting polymer will be.

Embodiments of the disclosed hybrid organometallic cathodes and cathode materials include an inorganic active material. The inorganic active material may comprise one or more of the following: metal oxides, sulfides, fluorides, and polyanions compounds. Some examples of the metal oxide include a layered and a spinel structure, such as $LiMO_2$ and $Li_xM_2O_4$ (0<x<2, M: one or more than one kind of elements among Ni, Co, Mn, Fe, Al, Cr), $MnO_2$, and $Li_yV_2O_5$ (0<y<2), and $LiN_{0.5}Mn_{1.5-z}Ti_zO_4$ (0<z<1.5), which are each a material obtained by substituting another transition metal for a part of Mn in a spinel structure, or mixtures thereof, lithium-rich mixed-metal oxides, $xLi_2MnO_3.(1-x)LiMO_2$ (0<x<1, M: Fe, Mn, Co, Ni, Al, Cr), and mixtures thereof. Some examples of suitable sulfides include $MoS_2$, $Li_2S$, $SeS_x$, and mixtures thereof. Some examples of suitable fluoride compounds include $MF_3$ (M=Ti, V, Fe, Mn, and Co), $LiAMF_6$ (A=Mg, Ca, Sr, Ba, Ni, Cu, Zn, Cd, M=Ti, V, Cr, Mn, Fe, Co, and Ni), and mixtures thereof. Some examples of polyanions include phosphates, such as $LiMPO_4$ (M: Fe, Mn, Co and Ni), borate such as $LiMBO_3$ (M: Fe, Mn, Co and Ni), silicate such as $Li_2MSiO_4$ (M: Fe, Mn, Co and Ni), and mixtures thereof.

The conductive agent may comprise an electroconductive material, such as electroconductive carbon, preferably an electroconductive carbon having a high surface area. For example, the conductive agent may comprise KETJENBLACK® carbon, graphene, carbon black, graphite, acetylene black, carbon materials of carbon fibers such as vapor frown carbon fibers (VGCF), carbon nanotubes, and an activated or a non-activated carbon, conductive polymers, or mixtures thereof.

Binders may also be included, such as polytetrafluoroethylene (PTFE), polyvinylidene fluoride, (or polyvinylidene difluoride) (PVDF). In the electrode making procedure, solvent is used to dissolve the binder, but the solvent is vaporized during the process and is not present in the final electrode.

For ease of discussion of weight ratios of the components of the electrode, the active materials and amounts are discussed as active material A and active material B as follows. Certain embodiments comprise, or consist essentially of, or consist of, an organometallic polymer electrode as active material (A), an inorganic compound as active material (B), and a conductive agent. For example, the organometallic active material may comprise poly(2-ferrocenylmethyl methacrylate), the inorganic active material may comprise LiFePO$_4$, and the conductive agent may comprise KETJENBLACK® carbon (or a different conductive agent or mixes of conductive agents), and in some embodiments, a binder, such as PTFE or PVDF.

Figure 1B:
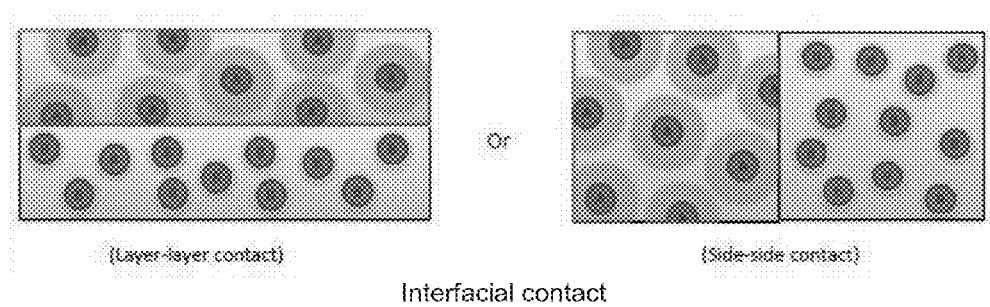
Figure 1C:
Figure 1D:
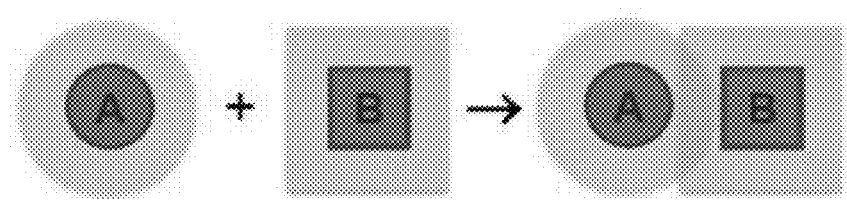

Notably, conventionally for hybrid electrodes, the organic material is mixed with the inorganic material and to that mixture conductive material is added (see FIG. 1(c)) or all three components are added at one time to one another. It has surprisingly been found that organometallic/inorganic hybrid electrodes have superior electrochemical performances by first mixing or coating the organometallic active agent (ferrocene polymer in certain embodiments) with the conductive agent then mixing it with the inorganic active agent and conductive agents in certain embodiments. In this manner, the organometallic active agent (A) and the inorganic active agent (B) each maintain its own electrical environments (see FIG. 1(d)). It is believed that the charge transfer environments for the organometallic active agent, particularly PFMMA active agent (A) differs from that of the inorganic active agent (B). That is, the local environments from each active material may influence each other in the hybrid electrode, i.e., the electrode environment surrounding one active material may be shared by the other. This leads to a synergistic effect associated with the environment interactions between the ferrocene polymer and the inorganic active agent, and such interaction promotes the charge transfer mechanism in the disclosed hybrid electrode system, thereby providing superior electrochemical performances of the disclosed hybrid electrodes.

Components A, B and the conductive agent may be present in the composition in various weight ratios. For example, the electrode or electrode active material may comprise poly(2-ferrocenylmethyl methacrylate) active material in amount a, pre-mixed with conductive agent in amount x, at a weight ratio range of from 1:20 to 10:1 for a:x (the weight ratio of active material A (a) to its conductive carbon (x)), preferably from 1:20 to 5:1, more preferably from 1:10 to 3:1 to form a poly(2-ferrocenylmethyl methacrylate)/conductive agent mixture. The poly(2-ferrocenylmethyl methacrylate)/conductive agent mixture is then combined with the inorganic/conductive agent mixture, which comprises inorganic active material in amount b and the conductive agent in amount y, with a weight ratio range of from 1:10 to 50:1 for b:y, preferably from 1:1 to 50:1, and more preferably from 2:1 to 50:1 to form the disclosed poly(2-ferrocenylmethyl methacrylate)/inorganic hybrid electrode by homogeneous mixing or interfacial contact as shown in FIGS. 1(a) and 1(b), respectively. Note that the weight ratios disclosed here are that of the active material to its conductive carbon while the weight percents in Table 2 below are that of the entire electrode.

In particular embodiments, the ferrocene polymer/conductive agent electrode mixture contains a significantly higher loading of conductive carbon than the inorganic electrode. This is attributed to the ferrocene polymer's highly electrical insulating characteristics that require a considerable amount of conductive carbon in the electrode to be electrochemically active. Both the mixing order with carbon and the weight ratios are factors affecting the electrode performance, with each adding to a synergistic effect.

In certain embodiments the weight ratio of organometallic to inorganic material in the electrode material or the electrode is from 1:100 to 100:1. In certain embodiments the weight ratio of organometallic to inorganic material in the electrode material or the electrode is from 1:50 to 50:1. In certain embodiments the weight ratio of organometallic to inorganic material in the electrode material or the electrode is from 1:30 to 10:1.

To determine the final weight ratio of each component in the hybrid cathode and obtain certain embodiments of the organometallic/inorganic hybrid electrodes while maintaining an optimized electrode environment for each component, two distinct materials are combined by introducing the compositions of entire PFMMA electrode (16.67% PFMMA, 73.33% KB, and 10% PTFE) and the entire LiFePO$_4$ electrode (80% LiFePO$_4$, 10% KB, and 10% PTFE) with a weight ratio of 50/50 in the hybrid electrode. The weight ratio of 50/50 is the weight ratio of the entire PFMMA electrode to the entire LiFePO$_4$ electrode. In this embodiment the entire PFMMA electrode contains 16.67% PFMMA, 73.33% KB, and 10% PTFE and the entire LiFePO$_4$ electrode contains 80% LiFePO$_4$, 10% KB, and 10% PTFE. In certain embodiments the weight ratios vary, such as 25/75, 50/50, and 75/25 of the entire PFMMA electrode to the entire LiFePO$_4$ electrode.

An example organometallic/inorganic electrode is made with active material PFMMA (a=0.05 g) (made as described above) being pre-mixed with conductive material (x=0.22 g) (Ketjenblack (EC-600JD, AkzoNobel Corp., Chicago, Ill.) by ball milling in a planetary mill (Retsch 100CM) at 400 rpm for 4 hours. (Notably, the detailed weight of each component such as disclosed in this particular example, is not critical, as it is the final weight ratio of 8/37/40/5/10, or 8.33/36.67/40/5/10 (as discussed below) that creates a preferred embodiment.) An inorganic active material, LiFePO$_4$ (b=0.24 g), (Phostech Lithium, Sud-Chemie, Canada) is next added and a conductive agent is added (y=0.03 g). For the step of adding inorganic active material (b) and its conductive carbon (y), the inorganic may be added first and then the second conductive agent component or the two may be mixed together and then added to the organometallic composition or both may simply be added at once to the organometallic composition. The mixture is further milled at 400 rpm for 2 hours. A binder PTFE (0.06 g) is added to the mixture and the mixture is further milled at 400 rpm for 1 hour. The milled composite powder, including active material PFMMA (a)/conductive agent (x)/active material LiFePO$_4$ (b)/conductive agent (y)/binder with a final weight ratio of 8.33/36.67/40/5/10, is rolled into a paper electrode using isopropanol (IPA) as a softener.

An example organometallic electrode is made with active material PFMMA (a=0.05 g) (made as described above), being mixed with conductive agent (x=0.22 g) by ball milling in planetary mill (Retsch 100CM) at 400 rpm for 4 hours. A binder PTFE (0.03 g) is added to the PFMMA/conductive agent mixture, and the mixture is further milled at 400 rpm for 1 hour. The milled composite powder, active material PFMMA (a)/conductive agent (x)/binder with a final weight ratio of 16.67/73.33/10, is rolled into a paper electrode using isopropanol (IPA) as a softener.

An example organic electrode is made with active material LiFePO$_4$ with active material LiFePO$_4$ (b=0.24 g) being mixed with conductive agent (y=0.03 g) by ball milling in planetary mill (Retsch 100CM) at 400 rpm for 2 hours. A binder, PTFE (0.03 g), is added to the mixture and further milled at 400 rpm for 1 hour. The milled composite powder, active material LiFePO$_4$ (b)/conductive agent (y)/binder with a final weight ratio of 80/10/10, is rolled into a paper electrode using isopropanol (IPA) as a softener.

Working electrodes, with a surface area of 1.6 cm$^2$ and thicknesses of 0.15-0.20 mm, were assembled into a half-cell configuration (2325 coin-type) in a dry glove box by using Li metal as an anode, 1M LiPF$_6$ in ethyl carbonate/dimethyl carbonate (1:1) as an electrolyte, and Celgard 3501 membrane as a separator. The cells were electrochemically cycled using an Arbin BT-2000 Battery Tester at room temperature. The high rate pulse discharge (HRPD) protocol followed the procedures: charging galvanostatically at the 1 C rate with the cutoff potentials of 4.2 V vs. Li/Li$^+$; and discharging at the 1 C rate for 100 s followed by 10 C (high rate pulse) for 10 s, repeating 1 C and 10 C with the cutoff potentials of 2.0 V vs. Li/Li$^+$ where the cell was then recharged. The C rate is based on the theoretical capacity of 280 mAh g$^{-1}$ for PFMMA, and 168 mAh g$^{-1}$ for LiFePO$_4$ as active material respectively. The cyclic voltammetry (CV) of the cells were carried out using a Solartron workstation. The CV measurement was performed with the low scan rate of 0.1 mV s$^{-1}$ and the potential range of 4.2-2.0 V vs. Li/Li$^+$ for five cycles.

Figure 2:
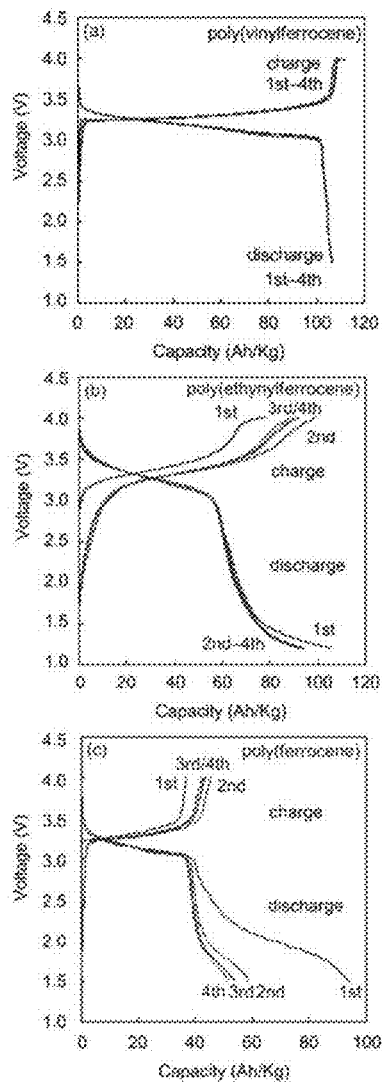
FIG. 2 are graphs of charge-discharge profile data obtained from prior art various pure ferrocene compounds.

For comparison purposes it is noted that cathodes formed of poly(vinylferrocene), poly(ethynylferrocene), and poly(ferrocene) polymers, as shown in Table 1 (no inorganic active agent), had stable and reversible redox reaction properties and fair rate capability but low specific capacity for use as cathode materials for lithium-ion batteries (see also, FIG. 2 showing data from K. Tamura, N. Akutagawa, M. Satoh, J. Wada, T. Masuda, *Macromol. Rapid Commun.* 2008, 29, 1944). As such, these materials were found to be insufficient for cathode materials and especially for hybrid cathodes for the preferred applications in lithium-ion batteries.

TABLE 1

| Polymer | m/e | Theor. capacity A·h·kg$^{-1}$ | Obsd. capacity A·h·kg$^{-1}$ | Obsd. capacity/Theor. capacity % |
|---|---|---|---|---|
| poly (vinylferrocene) | 212.7 | 126.0 | 105 | 83 |
| poly (ethynylferrocene) | 210.1 | 127.6 | 105 | 82 |
| poly(ferrocene) | 184.0 | 145.6 | 95 | 65 |

(See, K. Tamura, N. Akutagawa, M. Satoh, J. Wada, T. Masuda, *Macromol. Rapid Commun.* 2008, 29, 1944.)

Figure 3:
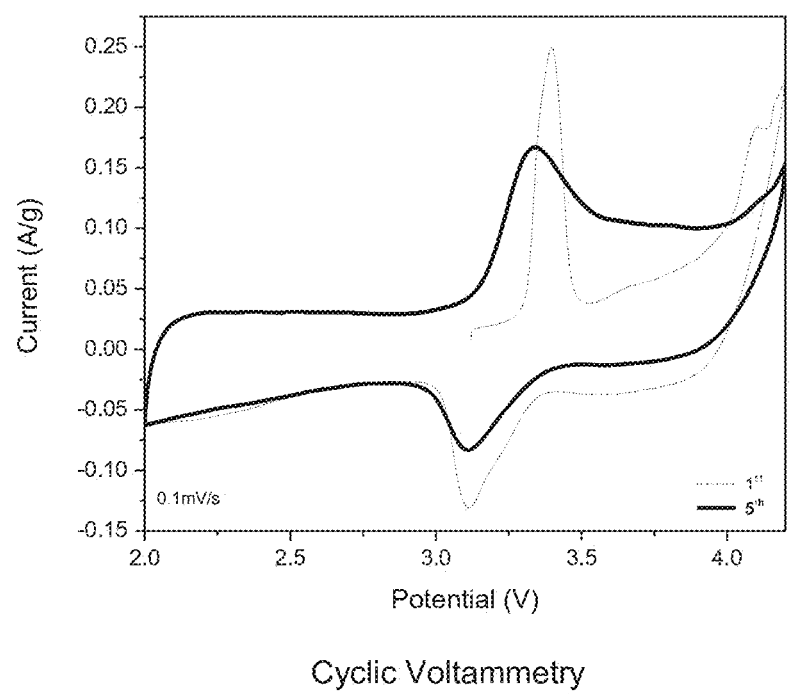
FIG. 3 is a graph of cyclic voltammetry data obtained from an embodiment of the cathode material consisting of poly(2-ferrocenylmethyl methacrylate) (PFMMA).
Figure 4:
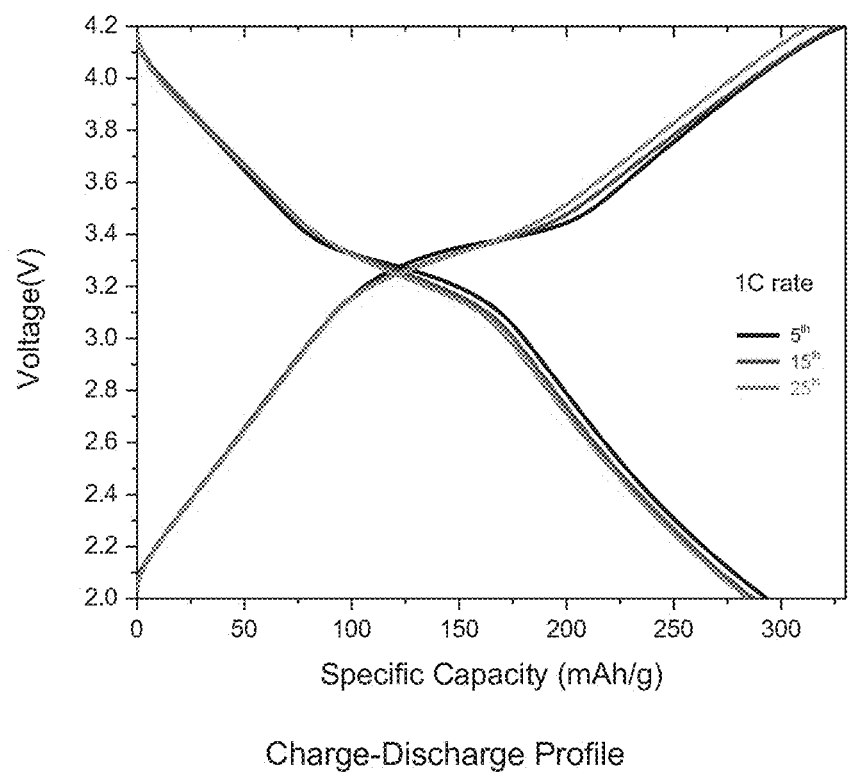
FIG. 4 is a graph of a charge-discharge profile data obtained from an embodiment of the cathode material consisting of PFMMA.
Figure 5:
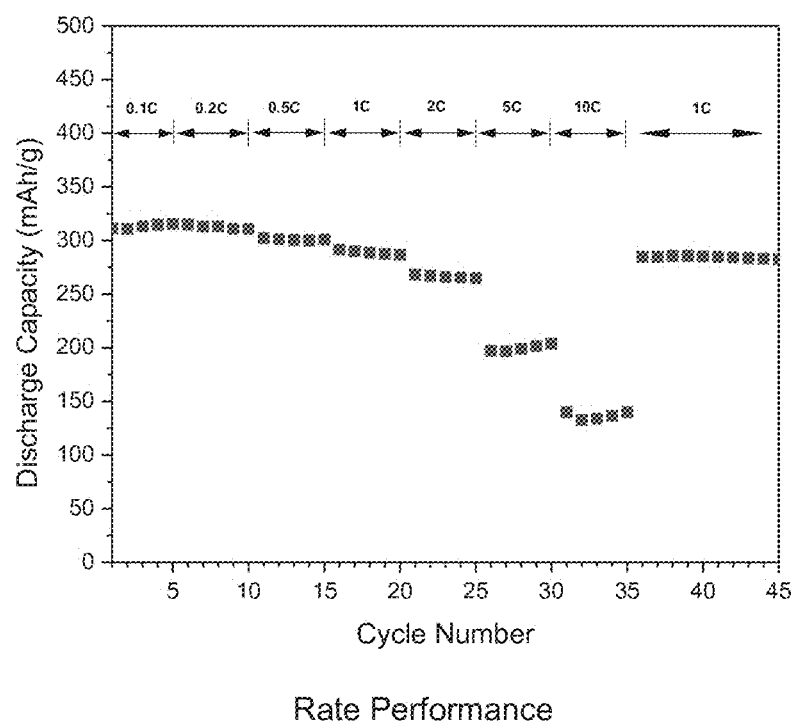
FIG. 5 is a graph of rate performance data obtained from an embodiment of the cathode material consisting of PFMMA (electrode thickness: 0.15 mm).

The electrochemical performances of the invented and disclosed hybrid electrodes have been investigated by cyclic voltammetry (CV). For comparison, an electrode made solely of PFMMA was characterized. FIG. 3 shows the CV curve of a PFMMA electrode in a half-cell of Li/PFMMA. A PFMMA electrode was used as working electrode, and Li metal was used as both counter and reference electrodes. FIG. 3 shows the CV curve of a PFMMA electrode at a scan rate of 0.1 mV s$^{-1}$ between 4.2 and 2.0 V vs. Li/Li$^+$ for the first and fifth cycles. The curve shows a stable and reversible redox reaction. A charge-discharge profile was determined as shown in FIG. 4 indicating a high specific capacity is achieved with the disclosed ferrocene polymer, being about 300 mAh/g at 1 C, which is a much higher specific capacity than prior cathodes, which are typically a specific capacity closer to about 100 mAh/g at 1 C. As shown in FIG. 5, the rate performance of the electrode made solely of PFMMA was determined for a 0.15 mm electrode thickness to be 140 mAh/g at 10 C. At 1 C the rate performance is near 300 mAh/g where conventional cathodes have a rate performance closer to about 150 mAh/g at 1 C.

Embodiments of the disclosed organometallic/organic hybrid electrodes were also examined. As shown in Table 2, the PFMMA is identified as Active Material A and LiFePO$_4$ is identified as Active Material B. Conductive Material x and y is KETJENBLACK and the binder comprises PTFE. The testing experiment specifics for each of the electrochemical analysis tests performed to obtain the data in the graphs of FIGS. 6-10 are set forth above.

TABLE 2

| Example | Active Material A (%) | Conductive Material x (%) | Active Material B (%) | Conductive Material y (%) | Binder (%) |
|---|---|---|---|---|---|
| Hybrid Example (50% A-50% B) | 8.333 | 36.667 | 40 | 5 | 10 |
| Baseline-1 (100% A) | 16.67 | 73.33 | — | — | 10 |
| Baseline-2 (100% B) | — | — | 80 | 10 | 10 |

Figure 6:
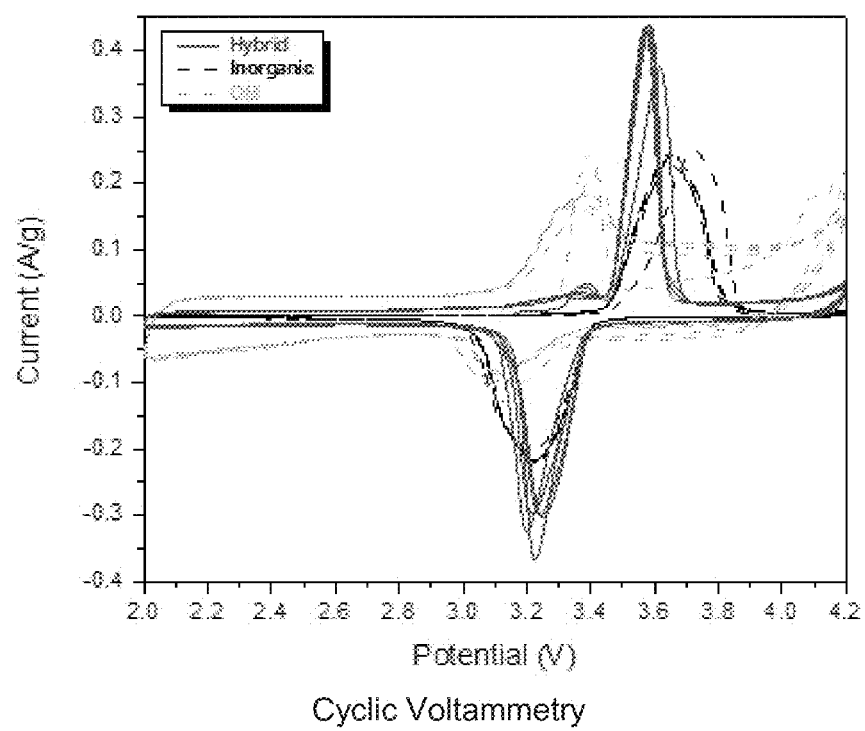
FIG. 6 is a graph of voltammetry data obtained from embodiments of an electrode material consisting substantially or completely of inorganic ($LiFePO_4$) electrode material ("Inorganic"), an electrode material consisting substantially or completely of the disclosed PFMMA electrode material ("OM"), and a hybrid electrode material ("Hybrid") consisting of the disclosed PFMMA polymer and $LiFePO_4$, as listed in Table 2.
Figure 7:
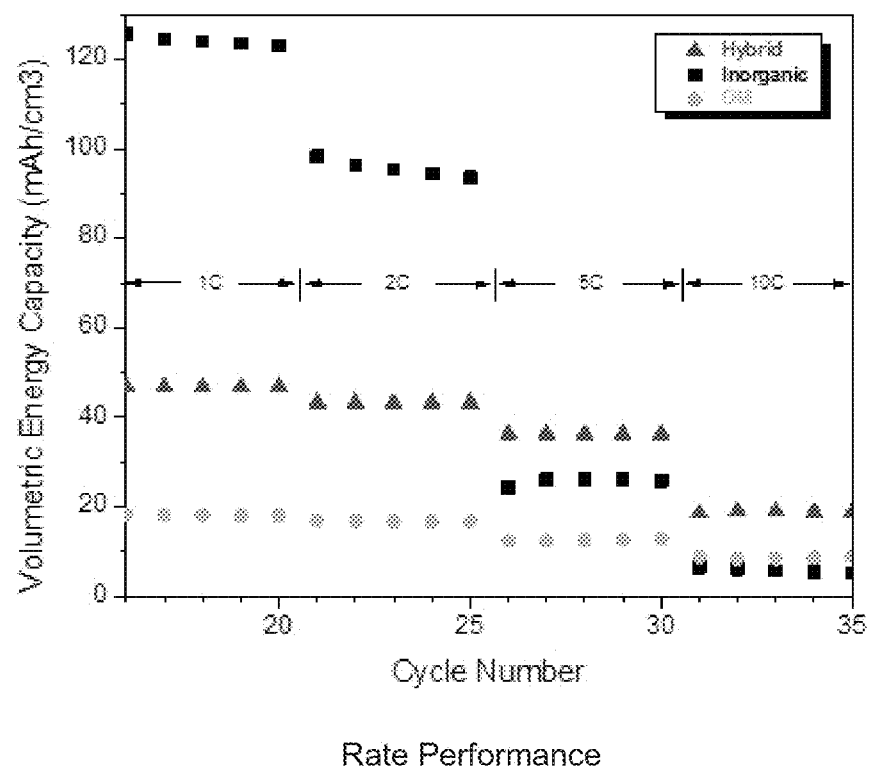
FIG. 7 is a graph of rate performance data obtained from embodiments of an electrode material consisting substantially or completely of inorganic ($LiFePO_4$) electrode material ("Inorganic"), an electrode material consisting substantially or completely of PFMMA electrode material ("OM"), and a hybrid electrode material ("Hybrid") consisting of PFMMA and $LiFePO_4$ (electrode thickness: 0.15 mm).

As shown in FIG. 6, electrochemical performance of the example electrodes (Table 2), including the embodiment of the disclosed PFMMA/LiFePO$_4$ (Hybrid in FIG. 6) as compared to an electrode made solely of PFMMA (OM in FIG. 6) and an electrode made solely of LiFePO$_4$ (Inorganic in FIG. 6) was investigated by cyclic voltammetry (CV). Further, the rate performance of the same examples was also determined. The PFMMA/LiFePO$_4$ hybrid cathode achieves improvements in the rate and reversibility of redox couples as compared to the Baseline 1 and 2 electrode examples (see Table 2), namely an electrode made solely of PFMMA and a LiFePO$_4$ cathode, respectively.

Figure 8:
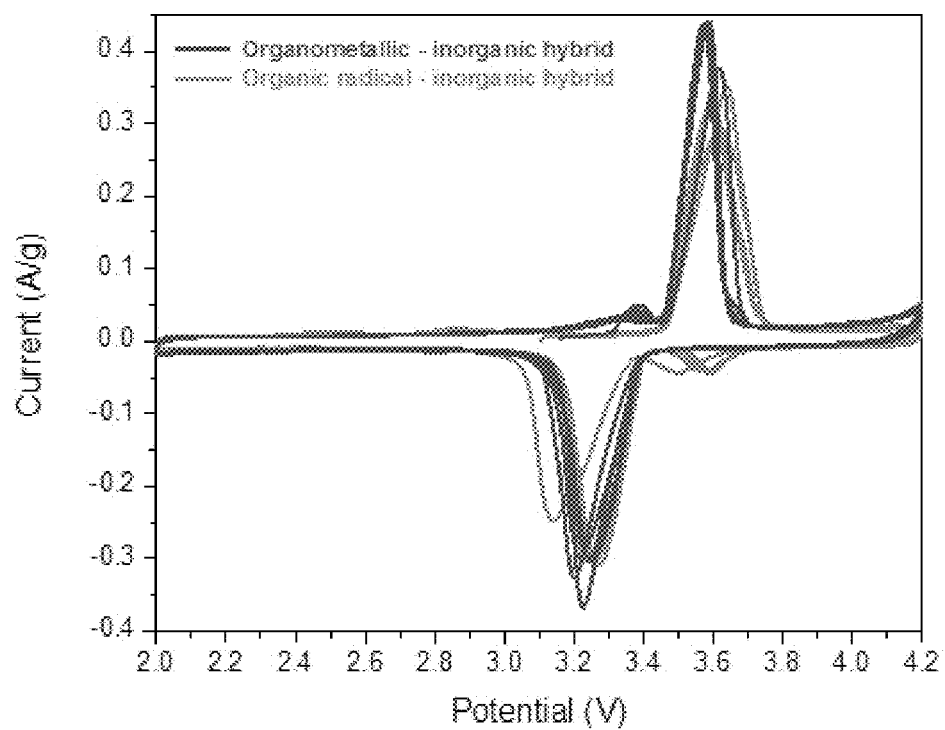
FIG. 8 is a graph of electrochemical analysis data of an embodiment of the disclosed PFMMA-$LiFePO_4$ organometallic-inorganic hybrid electrode material as compared to an embodiment of an organic radical-inorganic hybrid electrode material comprising poly(2,2,6,6-tetramethylpiperidinyloxy-4-yl methacrylate (PTMA).

FIG. 8 shows electrochemical analysis of the disclosed organometallic/inorganic hybrid cathode (PFMMA/LiFePO$_4$) versus an organic radical polymer/inorganic cathode (poly(2,2,6,6-tetramethylpiperidinyloxy-4-yl methacrylate) (PTMA)/LiFePO$_4$). The PFMMA/LiFePO$_4$ achieves a better rate and reversibility of redox couples as compared to the PTMA/LiFePO$_4$ hybrid cathode. The PFMMA/LiFePO$_4$ cathode produces much bigger redox peaks and a smaller gap between the redox peak potentials indicating this hybrid will have better performance in rate and reversibility.

Figure 9:
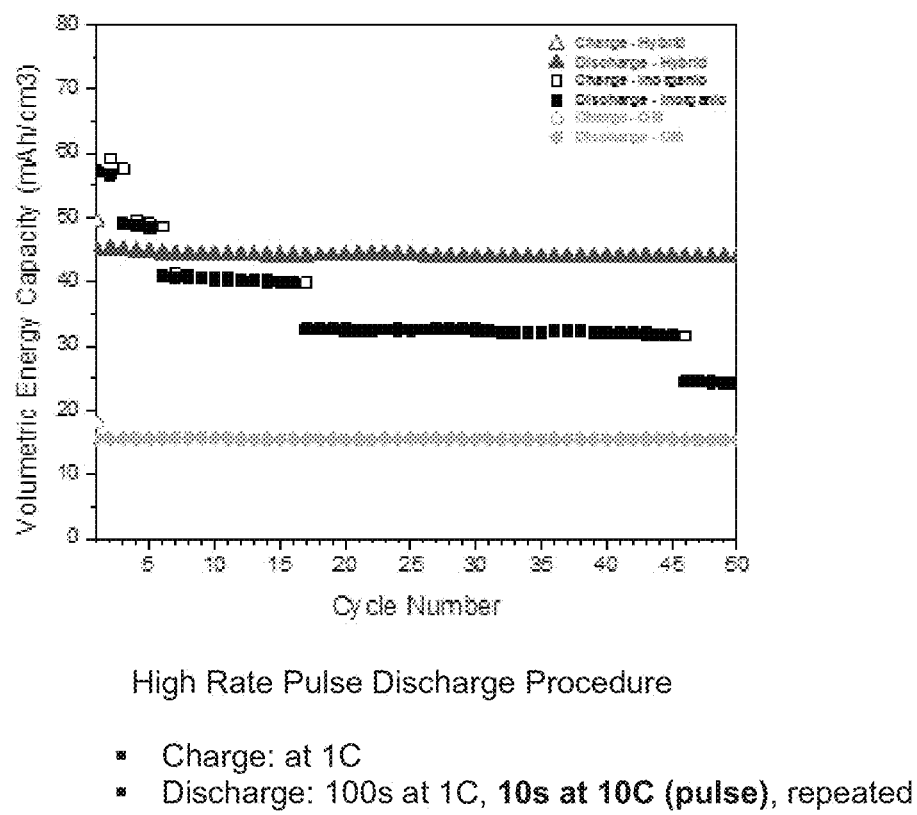
FIG. 9 is a graph of volumetric energy capacity (VEC) vs. cycle number in a high rate pulse discharge (HRPD) protocol data obtained from embodiments of an electrode material consisting substantially or completely of inorganic ($LiFePO_4$) electrode material ("Inorganic"), an electrode material consisting substantially or completely of the disclosed PFMMA electrode material ("OM"), and a hybrid electrode material ("Hybrid") consisting of the disclosed PFMMA polymer and $LiFePO_4$ (electrode thickness: 0.15 mm).

The electrochemical characterizations as discussed above (CV) demonstrate the capabilities of high (pulse) power and stability for the disclosed hybrid electrodes. To further validate these advantages, the cells were tested under high-rate pulse discharge (HRPD) protocol measured by volumetric energy capacity (VEC). The HRPD protocol and VEC measurement were targeted for the practical applications of hybrid electrodes in transportation or other high pulse power applications with limitations on volume. The protocol involves an initial charge at 1 C rate to 4.2 V followed by discharge at 1 C rate for 100 s followed by high rate (10 C pulse) for 10 s and repeated until 2.0V. FIG. 9 shows the VEC for the 50 cycles of HRPD protocol. As shown in FIG. 9, the disclosed PFMMA/LiFePO$_4$ hybrid cathode (Hybrid in FIG. 9) achieves significant improvements in high-pulse power capability and stability as compared to a cathode made of just PFMMA (OM) or just LiFePO$_4$ (Inorganic) as active materials. The high-pulse power performance analysis shows the benefit of the hybrid electrode, showing a superior capacity performance stability while the inorganic cathode has a poor power performance in the high-power testing. The cathode made of just organometallic as the active material, while being quite stable in capacity, has a very low volumetric energy capacity from the beginning, further illustrating the advantages of the disclosed hybrid cathode system.

Figure 10:
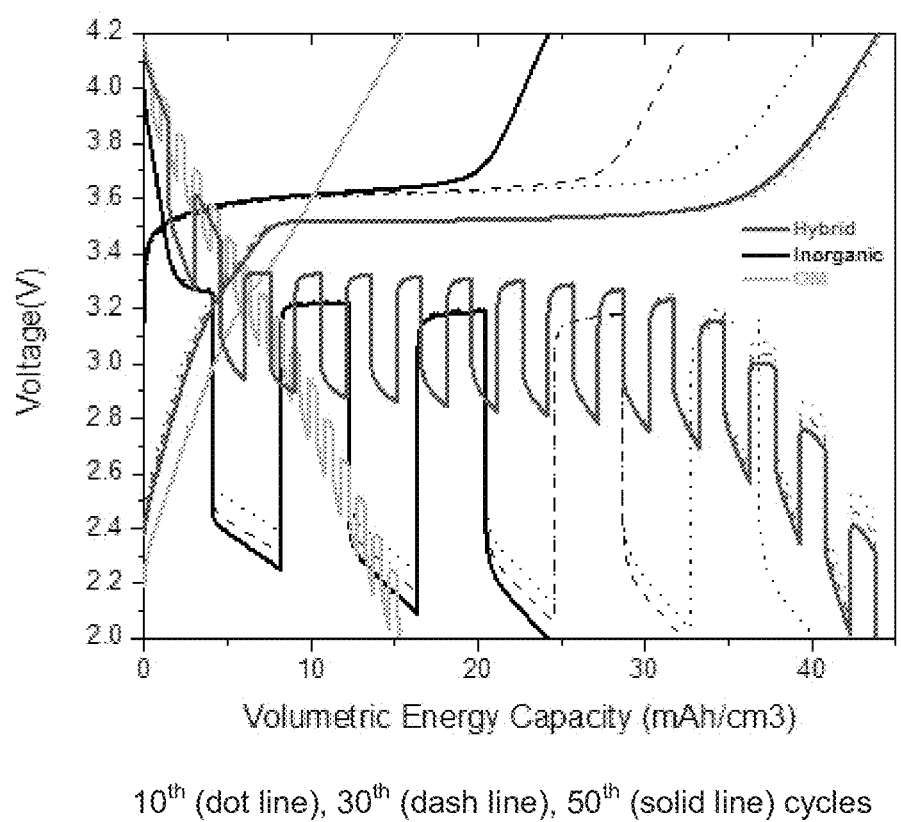
FIG. 10 is a graph of voltage vs. volumetric energy capacity (VEC) in a high rate pulse discharge (HRPD) protocol for the $5^{th}$ (solid line), $15^{th}$ (dash line), and $25^{th}$ (dot line) cycles data obtained from embodiments of an electrode material consisting substantially or completely of inorganic ($LiFePO_4$) electrode material ("Inorganic"), an electrode material consisting substantially or completely of the disclosed PFMMA electrode material ("OM"), and a hybrid electrode material ("Hybrid") consisting of the disclosed PFMMA polymer and $LiFePO_4$ (electrode thickness: 0.15 mm).

FIG. 10 further illustrates the benefits of the disclosed organometallic polymer/inorganic hybrid electrode through a high-power performance detailed process testing (HRPD). The results indicate that the disclosed hybrid cathode in discharge can sustain greater than 10 C of high power repeating and the capacity remains much higher than either the pure organometallic cathode (PFMMA) or the pure inorganic cathode (LiFePO$_4$) with the hybrid cathode having a capacity of greater than 40 mAh/cm$^3$. The cathode formed of just PFMMA as the active material has a VEC of 40 mAh/cm$^3$ only initially but after about 50 cycles its capacity goes down to just more than 20 mAh/cm$^3$. The cathode formed of just LiFePO$_4$ has a capacity of just about 15 mAh/cm$^3$.

The inventors' original hypothesis was that the organometallic component of the hybrid cathode would recharge the inorganic component of the cathode and thus, the capacity of the hybrid system should be completely or substantially completely from the organometallic component of the hybrid cathode but what was surprisingly found was that the disclosed hybrid cathode shows a higher capacity than either the pure organometallic cathode (ferrocene polymer) or the pure inorganic cathode (LiFePO$_4$) alone. Thus, the organometallic/inorganic hybrid cathode components act as more than an additive effect of the components but in fact provide a synergistic effect if made in the proper manner. Such synergistic effect, providing the higher capacity with the disclosed the organometallic/inorganic hybrid cathode, is especially pronounced at the higher power (pulse) performance range.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A lithium-ion battery cathode comprising:
a hybrid cathode composition comprising (a) an active material comprising a ferrocene polymer satisfying formula (2):

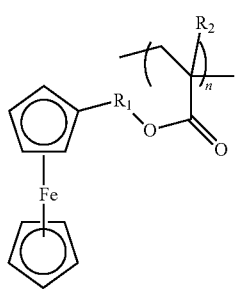

(2)

wherein n>0, R$_1$ is —(CH$_2$)—$_m$, m=1-10, and R$_2$=H or a methyl group, wherein the ferrocene polymer is at least 8% by weight of the lithium-ion battery cathode composition;
(b) an inorganic active material; and
(c) a first conductive material.

2. The cathode of claim 1 wherein the ferrocene polymer satisfying formula (1) comprises:

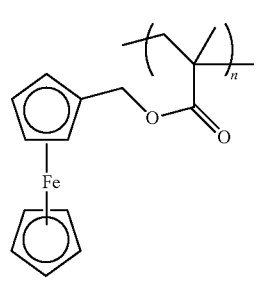

(1)

wherein n>0.

3. The cathode of claim 1 wherein the active material comprising a ferrocene polymer is poly(2-ferrocenylmethyl methacrylate) (PFMMA).

4. The cathode of claim 1 further comprising a second conductive material.

5. The cathode of claim 4 wherein the first conductive material is different from the second conductive material.

6. The cathode of claim 1 wherein the inorganic active material comprises LiMO$_2$, Li$_x$M$_2$O$_4$ wherein 0<x<2, and M is Ni, Co, Mn, Fe, Al, and/or Cr, MnO$_2$, Li$_y$V$_2$O$_5$ wherein 0<y<2, LiN$_{0.5}$Mn$_{1.5-z}$Ti$_z$O$_4$ wherein 0<z<1.5, xLi$_2$MnO$_3$·(1-x)LiMO$_2$ wherein 0<x<1 and M is Fe, Mn, Co, Ni, Al, and/or Cr, MoS$_2$, Li$_2$S, SeS$_x$, MF$_3$ wherein M is Ti, V, Fe, Mn, and/or Co, LiAMF$_6$ wherein A is Mg, Ca, Sr, Ba, Ni, Cu, Zn, and/or Cd and wherein M is Ti, V, Cr, Mn, Fe, Co, and/or Ni, LiMPO$_4$ wherein M is Fe, Mn, Co and/or Ni, LiMBO$_3$ wherein M is Fe, Mn, Co and/or Ni, Li$_2$MSiO$_4$ wherein M is Fe, Mn, Co and/or Ni, or mixtures thereof.

7. The cathode of claim 1 wherein the inorganic active material comprises LiFePO$_4$.

8. The cathode of claim 1 wherein m=1-5.

9. A lithium-ion battery cathode comprising a hybrid cathode composition comprising an active material comprising poly(2-ferrocenylmethyl methacrylate) (PFMMA) with a molecular weight of from 1,000 to 1,000,000.

10. The cathode of claim 9 further comprising a second conductive material.

11. A lithium-ion battery comprising:
a cathode comprised of a cathode active material comprising
(a) a ferrocene polymer satisfying formula (1):

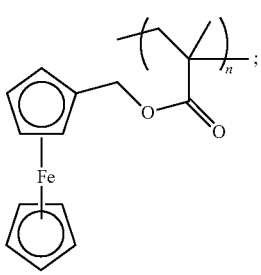

(1)

wherein n>0, and wherein the ferrocene polymer is at least 8% by weight of the cathode composition;
(b) an inorganic active material; and
(c) a conductive agent; and
an anode.

12. A cathode consisting essentially of:
a ferrocene polymer satisfying formula (1)

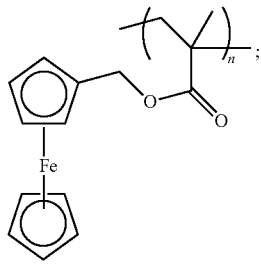
(1)

wherein n>0;
an inorganic active material;
a conductive agent:
a binder; and
wherein the ferrocene polymer is at least 8% by weight of the cathode.

13. A cathode comprising:
an active material comprising a ferrocene polymer satisfying formula (1):

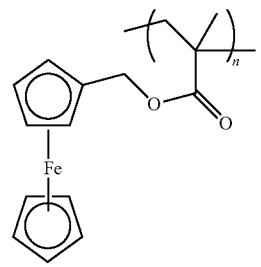
(1)

wherein n>0, and wherein the ferrocene polymer is at least 8% by weight of the cathode composition;
an inorganic active material;
a first conductive material;
a second conductive material; and
a binder.

14. The cathode of claim 13 wherein the weight ratio of the ferrocene polymer to the first conductive material is from 1:20 to 5:1.

15. The cathode of claim 13 wherein the first conductive material is different from the second conductive material.

16. The cathode of claim 13 wherein the inorganic active material comprises $LiFePO_4$.

17. A method of making a lithium-ion cathode composition, the method comprising:
mixing poly(2-ferrocenylmethyl methacrylate) (PF-MMA) with a first conductive agent to form an organometallic active material composition;
then mixing the organometallic active material composition with an inorganic active material and a second conductive agent to form a hybrid cathode composition.

18. The method of claim 17 wherein the first conductive agent is different from the second conductive agent.

19. The method of claim 17 wherein the inorganic active material comprises $LiMO_2$, $Li_xM_2O_4$ wherein 0<x<2, and M is Ni, Co, Mn, Fe, Al, and/or Cr, $MnO_2$, $Li_yV_2O_5$ wherein 0<y<2, $LiN_{0.5}Mn_{1.5-z}Ti_zO_4$ wherein 0<z<1.5, $xLi_2MnO_3 \cdot (1-x)LiMO_2$ wherein 0<x< and M is Fe, Mn, Co, Ni, Al, and/or Cr, $MoS_2$, $Li_2S$, $SeS_x$, $MF_3$ wherein M is Ti, V, Fe, Mn, and/or Co, $LiAMF_6$ wherein A is Mg, Ca, Sr, Ba, Ni, Cu, Zn, and/or Cd and wherein M is Ti, V, Cr, Mn, Fe, Co, and/or Ni, $LiMPO_4$ wherein M is Fe, Mn, Co and/or Ni, $LiMBO_3$ wherein M is Fe, Mn, Co and/or Ni, $Li_2MSiO_4$ wherein M is Fe, Mn, Co and/or Ni, or mixtures thereof.

20. The method of claim 17 wherein the inorganic active material comprises $LiFePO_4$.

21. A lithium-ion cathode composition comprising:
poly(2-ferrocenylmethyl methacrylate) (PFMMA), a first conductive agent, a second conductive agent and an inorganic active agent.

22. A method of making a cathode composition, the method comprising:
mixing an active material comprising a ferrocene polymer satisfying formula (2):

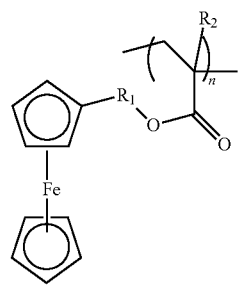
(2)

wherein n>0, $R_1$ is $-(CH_2)-_m$, m=1-10 and $R_2$=H or a methyl group, with a first conductive agent to form an organometallic active material composition, and wherein the ferrocene polymer is at least 8% by weight of the cathode composition;
then mixing the organometallic active material composition with an inorganic active agent and a second conductive agent to form a hybrid cathode composition.

23. A method of making a cathode composition, the method comprising:
mixing an active material comprising a ferrocene polymer satisfying formula (2):

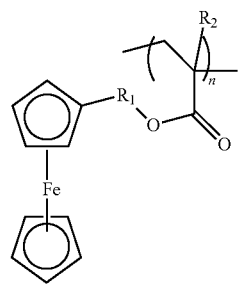
(2)

wherein n>0, $R_1$ is $-(CH_2)-_m$, m=1-10 and $R_2$=H or a methyl group, and wherein the ferrocene polymer is at least 8% by weight of the cathode composition, with a first conductive agent to form an organometallic active material composition:
then mixing the organometallic active material composition with an inorganic active agent to form a hybrid cathode composition.

* * * * *

UNITED STATES PATENT AND TRADEMARK OFFICE
CERTIFICATE OF CORRECTION

| | |
|---|---|
| PATENT NO. | : 9,444,096 B2 |
| APPLICATION NO. | : 14/167944 |
| DATED | : September 13, 2016 |
| INVENTOR(S) | : Huang et al. |

It is certified that error appears in the above-identified patent and that said Letters Patent is hereby corrected as shown below:

In the Specification

Column 1, Line 65, "$R_2$==H" should read --$R_2$=H--.

Column 2, Line 33, "conductive agent is" should read --conductive agent--.

Column 2, Line 41, "$Mn_{1.5-z}Ti_3O_4$" should read --"$Mn_{1.5-z}Ti_2O_4$"--.

Column 2, Line 41, "$xLi_2MnO_3.(1-x)LiMO_2$" should read --$xLi_2MnO_3 \cdot (1-x)LiMO_2$--.

Column 4, Line 6, "of a charge-discharge" should read --of charge-discharge--.

Column 6, Line 28, "refers an" should read --refers to an--.

Column 8, Line 63, "battery and magnesium battery." should read --batteries and magnesium batteries--.

Column 9, Line 33, "$R_1$==—" should read --$R_1$ = - --.

Column 9, Line 34, "$R_2$==H" should read --$R_2$=H--.

Signed and Sealed this
Twenty-third Day of May, 2017

Michelle K. Lee
*Director of the United States Patent and Trademark Office*

Column 11, Line 1, " 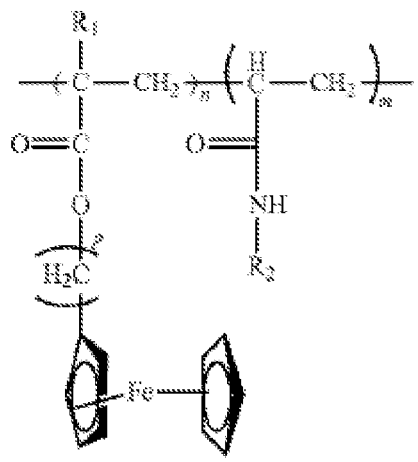 " should read -- 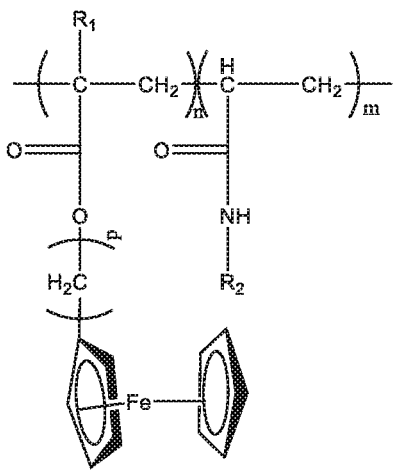 --.

Column 11, Line 64, "2-ferrocenemethyl)methacrylate" should read --2-(ferrocenemethyl)methacrylate--.

Column 12, Line 26, "polyanions" should read --polyanion--.

Column 12, Line 33, "xLi$_2$MnO$_3$.(1-x)LiMO$_2$" should read --xLi$_2$MnO$_3$·(1-x)LiMO$_2$--.

Column 12, Line 50, "frown" should read --grown--.

Column 13, Line 16, "each maintain" should read --each maintains--.

Column 13, Line 17, "environments" should read --environment--.

Column 17, Line 29, "the disclosed the" should read --the disclosed--.

In the Claims

Column 17, Line 62, "R$_2$═H" should read --R$_2$=H--.

CERTIFICATE OF CORRECTION (continued)
U.S. Pat. No. 9,444,096 B2

Column 18, Line 28, "$xLi_2MnO_3.(1$-" should read --$xLi_2MnO_3 \cdot (1$- --.

Column 18, Line 64, "east 8%" should read --least 8%--.

Column 19, Line 19, "agent:" should read --agent;--.

Column 19, Line 67, "$xLi_2MnO_3.(1$-" should read --$xLi_2MnO_3 \cdot (1$- --.

Column 20, Line 1, "0<x<" should read --0<x<1--.

Column 20, Line 32, "$R_2$==H" should read --$R_2$=H--.

Column 20, Line 59, "$R_2$==H" should read --$R_2$=H--.

Column 20, Line 63, "composition:" should read --composition;--.